United States Patent [19]
Case

[11] Patent Number: 5,143,052
[45] Date of Patent: Sep. 1, 1992

[54] FLOATING SOLAR POOL HEATER

[76] Inventor: Terry E. Case, 4212 Meadowview Dr., Lakeland, Fla. 33809

[21] Appl. No.: 784,461

[22] Filed: Oct. 7, 1991

[51] Int. Cl.$^5$ ............................................. F24J 2/42
[52] U.S. Cl. .................................... 126/415; 126/426
[58] Field of Search ............................. 126/415, 426

[56]  References Cited
U.S. PATENT DOCUMENTS

| | | | |
|---|---|---|---|
| 3,949,095 | 4/1976 | Pelehach et al. | 126/415 |
| 4,079,726 | 3/1978 | Voelker | 126/415 |
| 4,313,421 | 2/1982 | Trihey | 126/415 |
| 4,709,688 | 12/1987 | Paradis | 126/415 |

*Primary Examiner*—Carroll B. Dority
*Attorney, Agent, or Firm*—Hugh E. Smith

[57] ABSTRACT

A floating solar pool heater consists of a plurality of PVC tubes open at their ends and connected in parallel alignment to the tops of several floats. The tubes are open on their ends so that pool water can flow through them, and the tops of the tubes extend above the water's surface. The tubes heat faster than the water so as to effect a solar heating function. In a modified embodiment, the tubes are serially interconnected and a flexible tube is attachable from one end of the tubing directly to a pool water return outlet. Other embodiments employ the use of transparent tubing with darkened tape on a bottom portion, tubing with downwardly extending ends to facilitate water flow by convection currents, and the use of baffles to retard water flow within the tubing so as to effect a greater heating of the captured water. Additionally, tubing having internal air filled floats is also disclosed.

3 Claims, 4 Drawing Sheets

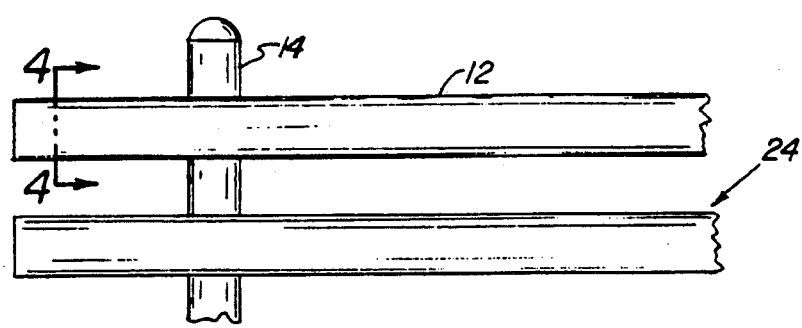
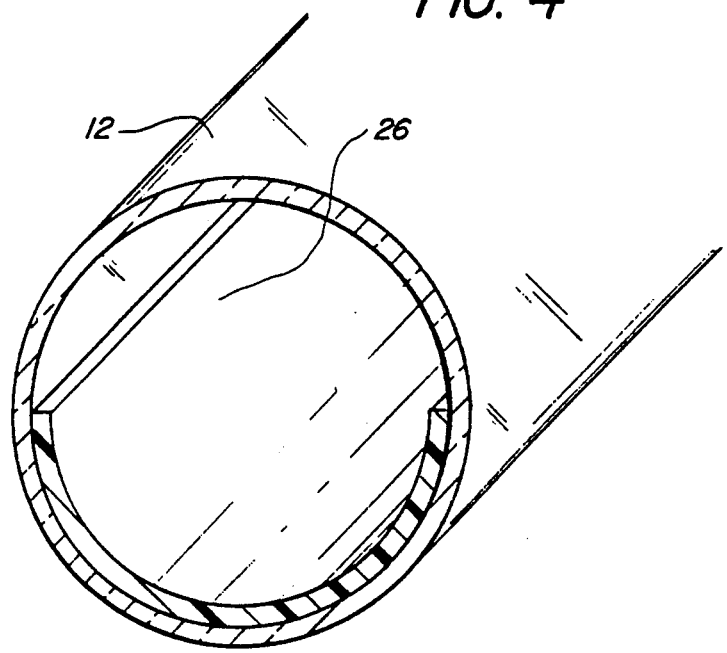
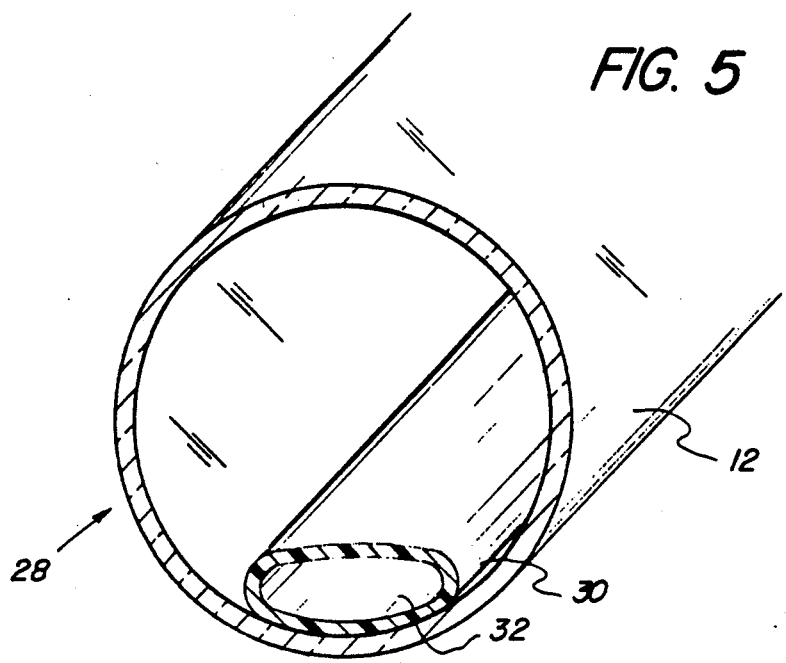

FLOATING SOLAR POOL HEATER

BACKGROUND OF THE INVENTION

1. Field of the Invention

The present invention relates to solar pool heaters and more particularly pertains to several embodiments of floating solar pool heaters which can be cheaply and efficiently manufactured from PVC tubing.

2. Description of the Prior Art

The use of solar pool heaters is well known in the prior art. A typical example of a solar pool heater which may be positioned directly on the water's surface, thus to eliminate the need for roof-mounted reflectors and conduits, is to be found in U.S. Pat. No. 4,426,995 which issued to G. Wilson on Jan. 24, 1984. The Wilson patent discloses a flexible solar quilt which collects and absorbs solar energy, and then transfers heat to the underlying ground, water or other medium. It includes gas tight compartments which are positioned between an upper film and a lower film. The quilt is designed to float on the surface of a pool and captures a substantial quantity of heat, with the cooler pool water then absorbing the heat in an a well known manner.

Another passive type solar heater which dispenses with the need for roof-mounted structural components is to be found in U.S. Pat. No. 4,875,466 which issued to S. Slonneger on Oct. 24, 1989. In this patent, there is disclosed a dome-shaped device described as a solar heating disk. The device floats upon the surface of the water and a captured air pocket prevents its submergence. The trapped air becomes heated under the disk and this heat is transferred to the pool water by conventional conduction.

While both of these described solar heating devices are functional for their intended purposes, both involve complex manufacturing processes which include the use of special molds, and neither can be manufactured from existing commercially available products. As such, there exists a continuing need for solar heating devices which eliminate roof-mounted structures and which can be efficiently and economically manufactured. In this respect, the present invention substantially fulfills this need.

SUMMARY OF THE INVENTION

In view of the foregoing disadvantages inherent in the known types of solar pool heaters now present in the prior art, the present invention provides an improved solar pool heater construction wherein the same can be easily and economically manufactured from existing commercially available products. As such, the general purpose of the present invention, which will be described subsequently in greater detail, is to provide a new and improved solar pool heater which has all the advantages of the prior art solar pool heaters and none of the disadvantages.

To attain this, the present invention essentially comprises a floating solar pool heater which consists of a plurality of PVC tubes open at their ends and connected in parallel alignment to the tops of several floats. The tubes are open on their ends so that pool water can flow through them, and the tops of the tubes extend above the water surface. The tubes heat faster than the water so as to effect a solar heating function. In a modified embodiment, the tubes are serially interconnected and a flexible tube is attachable from one end of the tubing directly to a pool water return outlet. Other embodiments employ the use of transparent tubing with darkened tape on a bottom portion, tubing with downwardly extending ends to facilitate water flow by convection currents and the use of baffles to retard water flow within the tubing so as to effect a greater heating of the captured water. Additionally, tubing having internal air filled floats is also disclosed.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved solar pool heater which has all the advantages of the prior art solar pool heaters and none of the disadvantages.

It is another object of the present invention to provide a new and improved solar pool heater which may be easily and efficiently manufactured and marketed.

It is a further object of the present invention to provide a new and improved solar pool heater which is of a durable and reliable construction.

An even further object of the present invention is to provide a new and improved solar pool heater which is susceptible of a low cost of manufacture with regard to both materials and labor, and which accordingly is then susceptible of low prices of sale to the consuming public, thereby making such solar pool heaters economically available to the buying public.

Still yet another object of the present invention is to provide a new and improved solar pool heater which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a partial top plan view of a third embodiment of the invention.

FIG. 4 is a cross-sectional view of the third embodiment of the invention as viewed along the line 4—4 in FIG. 3.

FIG. 5 is a cross-sectional perspective view of a fourth embodiment of the invention.

DESCRIPTION OF THE PREFERRED EMBODIMENTS

Figure 1:
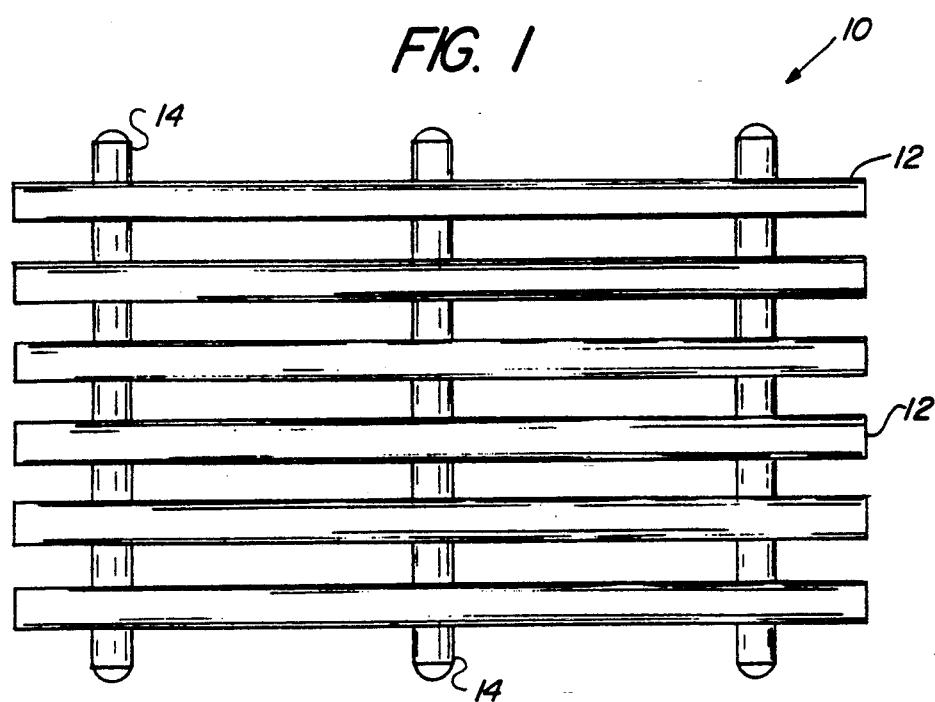
FIG. 1 is a top plan view of a first embodiment of the present invention.

With reference now to the drawings, and in particular to FIG. 1 thereof, a new and improved solar pool heater embodying the principles and concepts of the present invention and generally designated by the reference numeral 10 will be described.

More specifically, it will be noted that the first embodiment 10 of the invention consists of a plurality of paralleledly aligned, open-ended PVC tubes, all of which are generally designated by the reference numeral 12. The tubes 12 are adhesively or otherwise fixedly secured to a plurality of cross-extending floats 14, and this essentially completes the construction of the preferred embodiment of the invention.

In use, the assembly 10 is designed to freely float upon the surface of pool water. In normal use, the floats 14 will be beneath the surface of the water, and each of the tubes 12 will be partially submerged so that at least their top portions are above the water's surface. The available air space within the tubing will be heated by solar energy as will the tubes, and since both the air space and the tubing will be warmer than the water, heat will be transferred from the air space and tubing to the water to effect a solar heating function.

Figure 2:
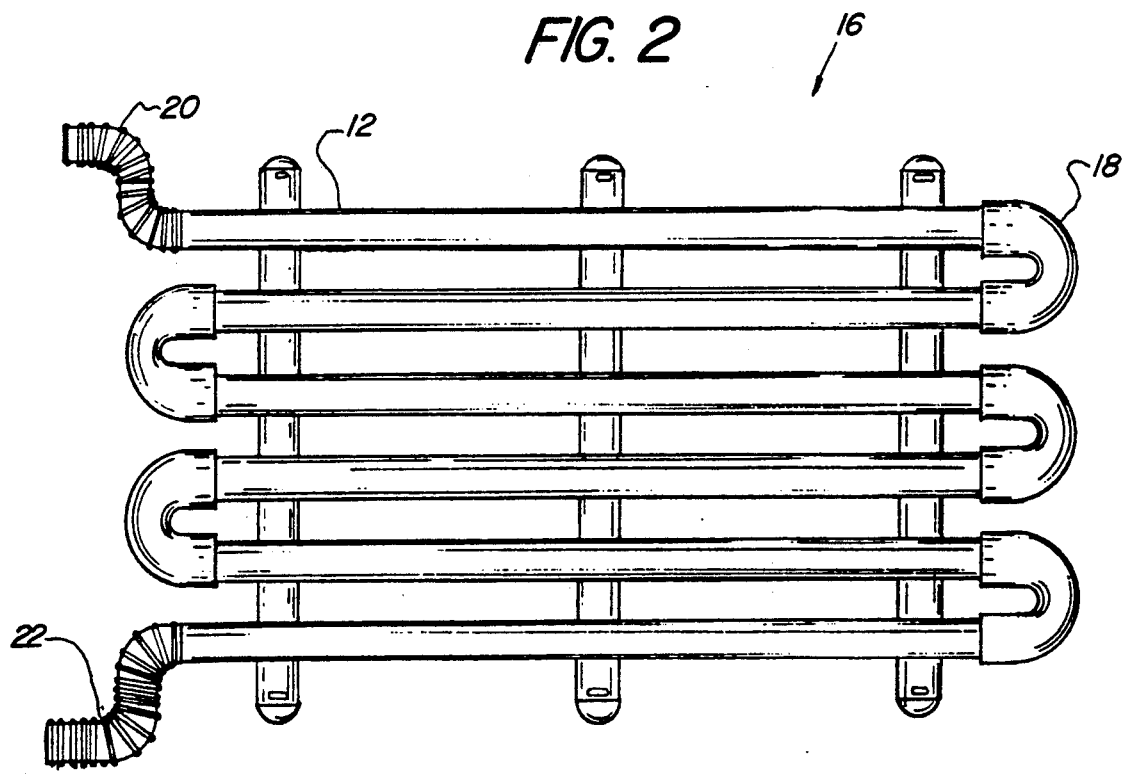
FIG. 2 is a top plan view of a second embodiment of the invention.

FIG. 2 of the drawings illustrates a modified embodiment of the invention which is generally designated by the reference numeral 16. This embodiment 16 is substantially identical to the embodiment 10 shown in FIG. 1 with the exception that each of the tubes 12 have ends thereof connected to U-shaped tubes 18 in the manner illustrated whereby one continuous flow circuit is defined by the interconnection of all of the tubes 12. A first flexible hose 20 is attached to one remaining free end of a tube 12, and a second flexible hose 22 is connected to the remaining free end at the other end of the assembly 16. One of the flexible tubes 20, 22 may then be directly attached to an unillustrated pool water return outlet while the remaining tube may be positioned wherever desired within the pool and/or adjoining hot tub for example. In this configuration, pool water is pumped through all of the tubes 12 in a circuitous manner before redelivery to the main body of pool water, thereby to increase the length of time that the water is exposed to solar heating.

FIGS. 3 and 4 of the drawings illustrate a third embodiment of the invention which is generally designated by the reference numeral 24. This third embodiment 24 is substantially similar to the embodiment 10 shown in FIG. 1 with the exception that the tubing 12 is formed from a transparent plastic, and a dark tape or some other material 26 is attached to an interior bottom surface of each tube. The darkened tape 26 serves to absorb solar energy, thus to become substantially heated, and this heat is directly transferred to water flowing through the associated tube 12.

FIG. 5 of the drawings illustrates a fourth embodiment of the invention which is generally designated by the reference numeral 28. This fourth embodiment makes use of tubes 12, which could be used in any of the prior discussed embodiments, and includes a smaller interior tube 30 which is attached to a bottom portion thereof and which is sealed at its respective ends so as to form an internal closed air pocket 32. In this construction, the air pocket 32 operates to collect heat in a well understood manner and this heat is transferred directly to water passing through the tube 12 and further, the sealed tube 30 operates as a float so that the aforedescribed floats 14 could effectively be eliminated.

Figure 6:
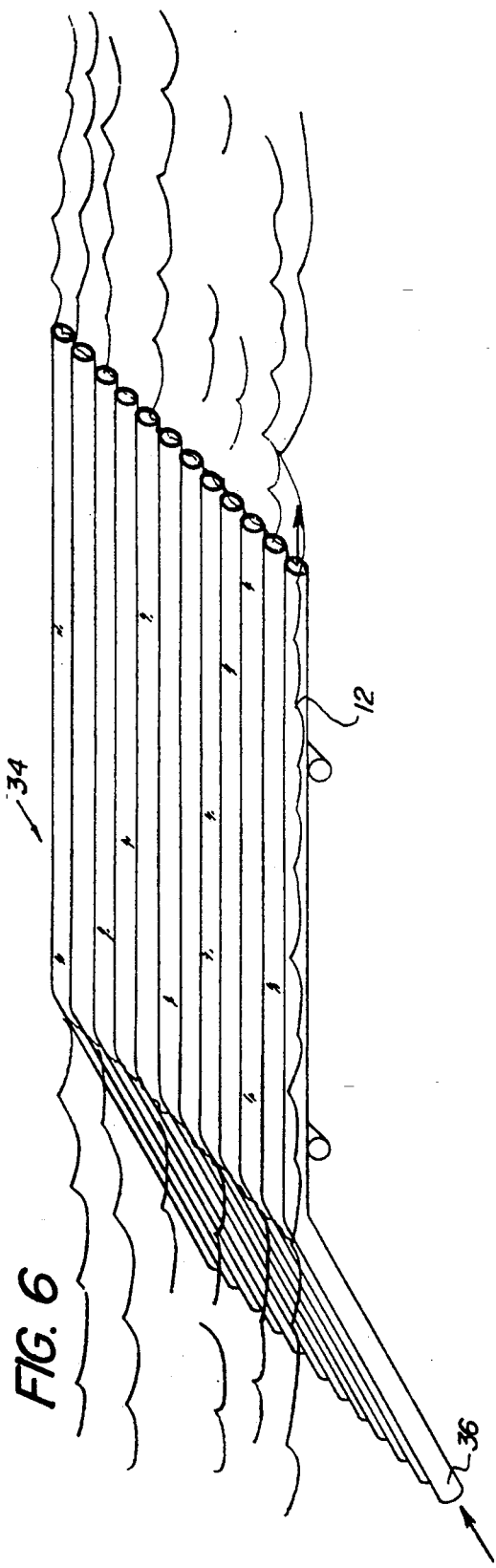
FIG. 6 is a perspective view of a fifth embodiment of the invention.
Figure 7:
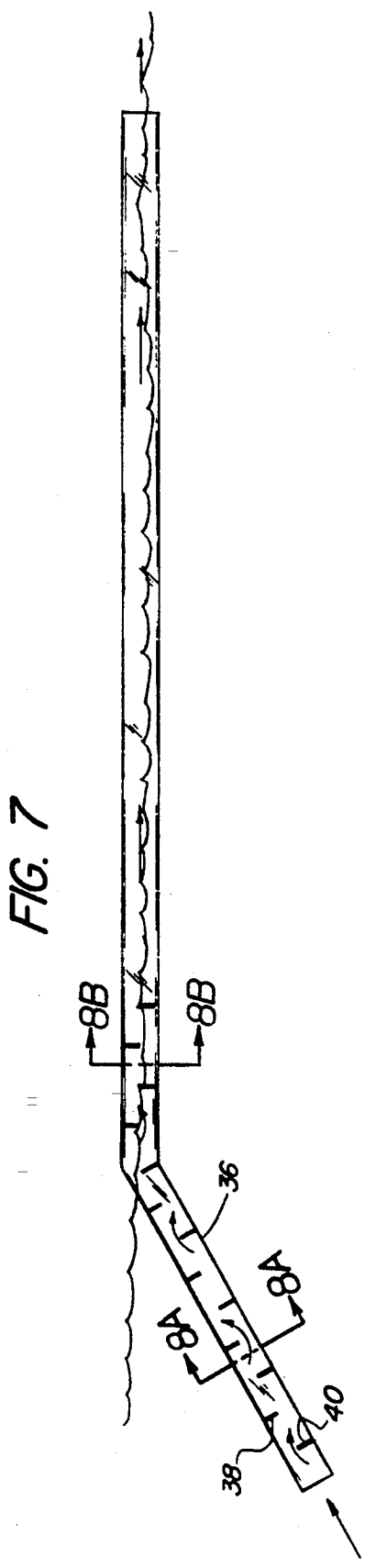
FIG. 7 is a side elevation view of the fifth embodiment of the invention.

FIGS. 6 and 7 illustrate a fifth embodiment of the invention which is generally designated by the reference numeral 34. The construction of this embodiment 34 is substantially similar to the embodiment 10 shown in FIG. 1 with the exception that one free end 36 of each of the tubes 12 is angulated in a paralleledly aligned fashion downwardly into the body of pool water. Since pool water is warmer at its surface, there is a natural upward flow of pool water, and the downwardly angulated ends 36 of the tubes 12 take advantage of this natural convection current flow.

As shown in FIG. 7, a plurality of downwardly extending baffles 38 and upwardly extending baffles 40 may be positioned in the angulated leg 36 of a tube, and these baffles can continue into the horizontal surface portion of the tube if desired.

Figure 8A:
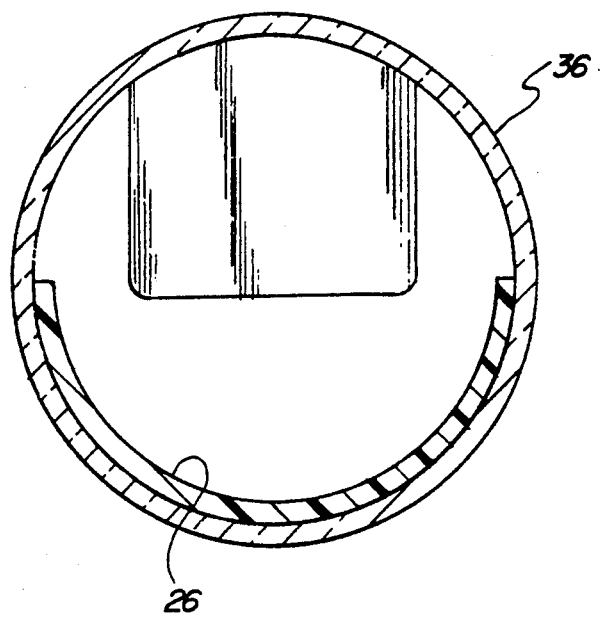
FIG. 8a is a cross-sectional view of the invention as viewed along the line 8a—8a in FIG. 7.
Figure 8B:
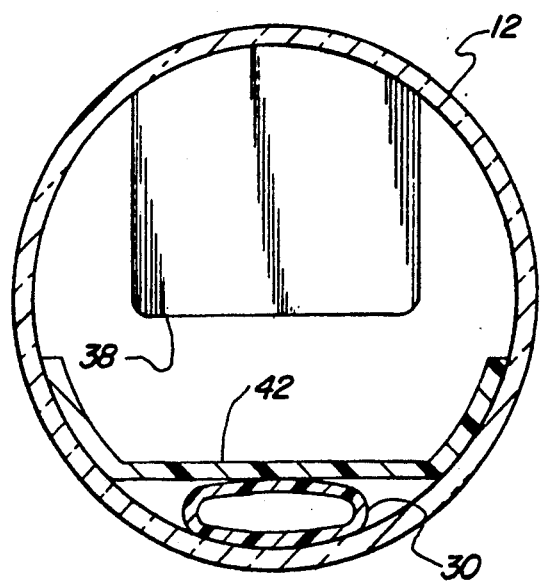
FIG. 8b is a cross-sectional view of the invention as viewed along the line 8b—8b in FIG. 7.

Other features may be incorporated in the embodiment 34 of the invention as shown in FIGS. 8a and 8b. In this regard, the solar absorption tape 26 may be used in each downwardly extending leg portion 36 to enhance the heating effect of the water. Similarly, a modified form of heat absorption tape 42 can be positioned in the surface section of the tubing 12 with this modified form being positioned over the aforedescribed sealed air float 30 which was used in the embodiment 28.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved solar pool heater comprising:
   at least one conduit through which pool water may flow, said at least one conduit being exposed to solar energy so as to effect a heating of said pool water passing therethrough; and
   float means attached to said at least one conduit, whereby said conduit is maintained in a floating position on a surface of pool water, said float means comprising a sealed tube having a captured air pocket, said sealed tube being positioned interiorly of said at least one conduit.

2. A new and improved solar pool heater comprising:
   at least one conduit through which pool water may flow, said at least one conduit being exposed to solar energy so as to effect a heating of said pool water passing therethrough, said at least one conduit having at least one free end thereof angulated downwardly into said pool water, thereby to enhance a convection flow movement of said pool water therethrough; and
   float means attached to said at least one conduit, whereby said conduit is maintained in a floating position on a surface of pool water.

3. A new and improved solar pool heater comprising:
   at least one conduit through which pool water may flow, said at least one conduit being exposed to solar energy so as to effect a heating of said pool water passing therethrough, and further including a use of at least one baffle within said at least one conduit, said baffle serving to retard flow of said water therethrough, thereby to increase an exposure of said pool water to said solar energy, and further including a solar energy absorption material on a bottom interior portion of said at least one conduit; and
   float means attached to said at least one conduit, whereby said conduit is maintained in a floating position on a surface of said pool water, said float means comprising a sealed tube having a captured air pocket, said sealed tube being positioned interiorly of said at least one conduit.

* * * * *